United States Patent [19]

Van Cleave et al.

[11] 4,319,102

[45] Mar. 9, 1982

[54] MULTI-POLE SWITCH

[75] Inventors: Stephen W. Van Cleave, Kensington; Sam T. Hank, Sebring; Andrew F. Deming, Alliance, all of Ohio

[73] Assignee: The Alliance Manufacturing Company, Inc., Alliance, Ohio

[21] Appl. No.: 111,690

[22] Filed: Jan. 14, 1980

[51] Int. Cl.[3] .......................... G06K 7/06; H01H 43/08

[52] U.S. Cl. ...................................... 200/46; 200/1 A; 200/6 C; 200/284

[58] Field of Search ................ 200/46, 49, 6 C, 6 BB, 200/284, 1 A, 44; 235/64.11

[56] References Cited

U.S. PATENT DOCUMENTS

| | | | |
|---|---|---|---|
| 3,448,248 | 6/1969 | Jarrett et al. | 200/46 |
| 3,567,911 | 3/1971 | Grundberg | 200/46 |
| 3,957,334 | 5/1976 | Pass et al. | 200/46 |
| 4,041,259 | 8/1977 | Deming | 200/46 |
| 4,046,980 | 9/1977 | Rosebrock | 200/46 |
| 4,051,349 | 9/1977 | Englund | 200/44 |

*Primary Examiner*—Willis Little

*Attorney, Agent, or Firm*—Pearne, Gordon, Sessions, McCoy & Granger

[57] ABSTRACT

A multiple pole switch assembly is disclosed which is a simple structure of a housing having contact means and a metallic conductor comb with a plurality of teeth overlying the contact means. The housing is formed of base means and a cover therefor, which cover slides onto the base means in a first direction substantially parallel to the conductor teeth on the comb. The teeth of the comb extend through apertures in the base means and are clamped in position by the cover, with the cover latched in place on the base. The teeth extending through the base means may then be soldered to the base means, and the back of the comb may be broken off along a weakened area of the comb teeth. Switch actuator means is provided in the form of a thin insulator card having a preselected spacing of apertures in a row. The presence or absence of an aperture in the row establishes switch-open or switch-closed conditions. The foregoing abstract is merely a resume of one general application, is not a complete discussion of all principles of operation or applications, and is not to be construed as a limitation on the scope of the claimed subject matter.

29 Claims, 5 Drawing Figures

MULTI-POLE SWITCH

BACKGROUND OF THE INVENTION

The invention relates to electricity, circuit makers and breakers, and also multiple circuit controls. The prior art has disclosed switches wherein an end of a cantilever blade can engage a stationary contact if an end of the blade drops into an aperture notch in a movable actuator. U.S. Pat. No. 4,041,259 showed a construction of a multiple pole switch assembly actuated by an insulator card which had apertures. However, such switch construction utilized rivets individually placed in a circuit board and as the number of poles in the switch assembly increased, the number of such individually placed rivets also had to increase. This added to the complexity of assembly and cost of the unit. Accordingly, an object of the invention is to provide a switch mechanism which has a minimum of parts for easy assembly.

Another object of the invention is to provide a multipole switch wherein a conductor comb with conductor teeth is used during assembly and then the back of the comb is removed for electrically separate conductor teeth.

Another object of the invention is to provide a switch with a cover sliding on a base and latching in position for ready assembly.

Another object of the invention is to provide a multipole switch with only five parts, and with all the parts easily fabricated and assembled.

Another object of the invention is to provide a multiple pole switch assembly which may be manufactured in any increased number of poles without increasing the number of parts in the switch assembly.

SUMMARY OF THE INVENTION

The invention may be incorporated in a multiple pole switch assembly comprising in combination, a housing having first and second opposed faces, contact means on said housing extending substantially in a row, a plurality of apertures extending through a part of said housing, a metallic conductor comb disposed between said faces and having a plurality of teeth extending in said apertures, an integral back on said comb extending on one side of said contact means with the plurality of teeth of the comb overlying said contact means and adapted to make selective engagement therewith, said comb back being accessible from an area exterior of said housing to be removable to establish individual contact blades of a multiple pole switch assembly.

The invention may further be incorporated in a multiple pole switch assembly comprising, in combination, a housing having first and second opposed faces and an opening, contact means extending along a first line on said first face, a metallic conductor comb adjacent one of said faces and having a plurality of contact teeth extending substantially parallel, an integral back on said comb extending on one side of said first line with the plurality of teeth of the comb overlying said contact means, an area on each of said comb contact teeth adapted to engage said contact means to establish a switch-closed condition, said comb back being accessible from an area exterior of said housing to be removable to establish electrically separate contact teeth of a multiple pole switch assembly, switch actuator means including an insulator card acting through said housing opening into the space between said faces to coact with said contact teeth, and said insulator card having a pre-selected spacing of apertures in a row with the presence of an aperture in said row at a given contact tooth determining switch-open or switch-closed conditions.

The invention may further be incorporated in a switch assembly comprising, in combination, a housing including base means and a cover therefor, said base means having a first face, a plurality of conductor blades on said base means extending substantially parallel to each other, contact means on said first face of said base means in a first line cooperable with each of said conductor blades, said cover being closable on said base means in a first direction substantially parallel to said conductor blades, alignment surfaces on one of said cover and said base means substantially parallel to said first direction maintaining substantially parallel alignment of said conductor blades, and switch actuator means acting on one of said conductor blades and said contact means to establish selective conductive and non-conductive conditions for each of said conductor blades relative to said contact means.

Other objects and a fuller understanding of the invention may be had by referring to the following description and claims, taken in conjunction with the accompanying drawing.

DESCRIPTION OF THE PREFERRED EMBODIMENT

Figures 1, 2, 3:
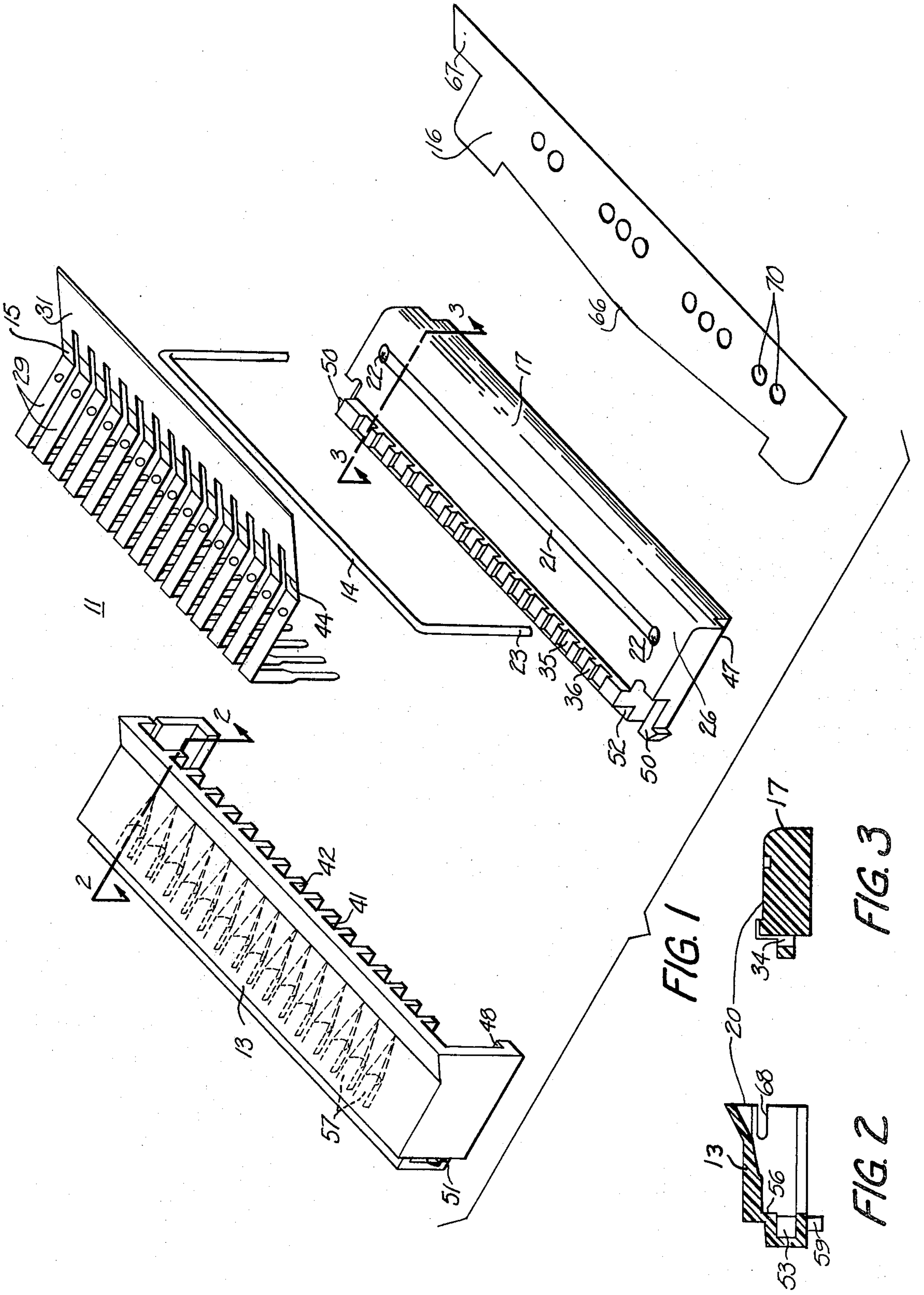
FIG. 1 is an enlarged, exploded, isometric view of the switch assembly of the invention.
FIG. 2 is a sectional view on line 2—2 of FIG. 1.
FIG. 3 is a sectional view on line 3—3 of FIG. 1.

The FIGS. of the drawing illustrate the switch mechanism 11 incorporating the invention. This switch mechanism includes generally base means 12, a cover 13, contact means 14, a metallic conductor comb 15, and a switch actuator 16. The base means 12 may be considered a compound base with a first base member 17 and a second base member 18. The switch mechanism 11 is operable without the second base member 18, but it is usable therewith, since this second base member 18 may be something similar to a printed circuit board having a conductor pattern 19 on the underside thereof.

The first base member 17 has a groove 21 terminating at apertures 22 passing through the base member. This groove 21 defines a first line and the contact means 14 extends along this first line. This contact means 14 may be a plurality of individual contacts, but in this preferred embodiment this contact means 14 is disclosed as a bus bar lying longitudinally in the groove 21 and having ends 23 extending downwardly through the apertures 22.

Figure 4:
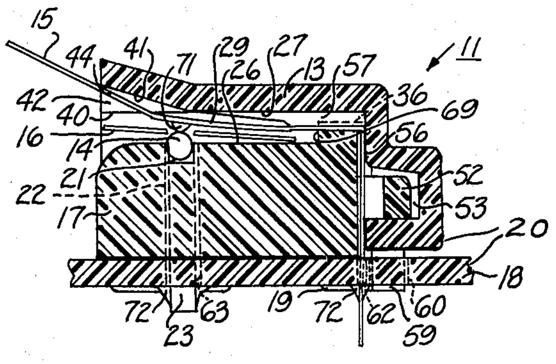
FIG. 4 is a sectional view through a normally closed pole of the switch.
Figure 5:
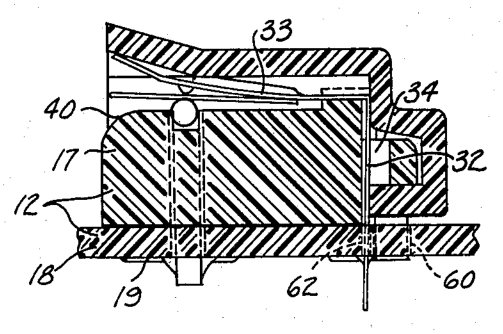
FIG. 5 is a sectional view through a normally open pole of the switch.

The switch mechanism 11 may be considered as having a housing 20, which includes generally the base means 12 and the cover 13. This housing has first and second opposed faces 26 and 27, respectively. In the embodiment shown, the first face 26 is on the first base member 17, and the second face 27 is on the cover 13. A plurality of conductor blades or conductor teeth 29 is provided on one of these faces, and in the embodiment shown they are provided on the first face 26. Initially, these conductor blades are a part of the metallic conductor comb 15 having a comb back 31, with the conductor blades or contact teeth extending from one side thereof. As best shown in FIGS. 1, 4, and 5, each of these conductor blades has an approximately right-angle bend to form an L-shape with a short leg 32 and a long leg 33. The individual short legs 32 extend through conductor apertures 34 in the first base member 17, and the long legs 33 individually lie in grooves 35 between alignment surfaces 36. These grooves 35 help hold the individual conductor blades in substantially parallel alignment. The comb back 31 extends on one side of the contact means 14, with the individual contact teeth of the comb overlying the contact means 14 and adapted to cooperate with such contact means. Each tooth is adapted to engage the contact means 14 for a switch-closed condition, and is adapted to be separated from such contact means for a switch-open condition.

The cover 13 is shown separated from the switch mechanism in FIGS. 1 and 2, and is shown assembled to the mechanism in FIGS. 4 and 5. The housing 20 has a flared opening 40 between the first and second faces 26 and 27. Grooves 41 are also provided at this opening 40, as defined by alignment surfaces 42, with an individual conductor blade in each of the grooves 41 which help to maintain substantially parallel alignment of these conductor blades 29. The comb back 31 is accessible from an area exterior of the housing 20 to be removable. This may be accomplished by shearing, and in the preferred embodiment is accomplished by having a weakened area formed by a score line 44 adjacent the comb back 31 so that the comb back 31 may be broken off or removed after assembly onto the first base member 17. This establishes mutually insulated individual contact blades 29.

The cover 13 is assembled onto the first base member 17 in a first direction substantially parallel to the first face 26 or parallel to the long legs 33 of the conductor blades 29. This cover 13 is closable on this first base member 17 by such sliding movement. The sliding movement is permitted by cooperating tongue and groove surfaces between the cover and base and in the embodiment shown, a tongue or ledge 47 is provided on each end of the first base member 17 and a cooperating groove 48 is formed in each end of the cover 13. This tongue and groove means 47, 48 thus permits this sliding movement in the first direction. Latch means is provided between the cover 13 and base member 17, and in this embodiment this is provided by a unitary latch 50 on each end of the base member 17 which cooperates with a latch aperture 51 on each end of the cover 13. A tongue 52 is provided along the rear of the base member 17 and a cooperable groove 53 is provided in the rear of the cover 13 to engage this tongue 52. This acts as an abutment stop so that when the cover 13 is slid to the left, as viewed in FIGS. 4 and 5, onto the base member 17, then when the tongue 52 fully engages the groove 53, the latches 50 will snap into engagement in the latch apertures 51, thus latching the cover 13 onto the base member 17. When so latched, the cover has an abutment surface 56 which abuts the short leg 32 of the conductor blades to force them against the forward edge of the conductor apertures 34 to help secure them in aligned position. Also, the cover has individual abutments 57 which slidably engage the upper surface of the conductor blades 29 in each of the grooves 35 to force each of these conductor blades into such grooves, again to aid the substantially parallel alignment of the conductor blades 29. Also, abutments 57 bend the conductor blades 29 into a curve to aid contact pressure when in the switch-closed condition.

The cover 13 is further provided with abutments 59 near each end thereof, and these are disposed perpendicularly to the first direction of closing movement of the cover 13 on the base member 17. These abutments 59 are adapted to engage abutment apertures 60 in the second base member 18. As stated above, this second base member 18 might be a printed circuit board with a conductor pattern 19 thereon, and when the assembled cover 13 and first base member 17 are placed on the second base member 18, the individual conductor blades 29 extend through conductor apertures 62 in this base member 18 and the bus bar ends 23 extend through bus bar apertures 63 in this base member 18.

The switch actuator 16 acts to establish selective switch-open and switch-closed conditions for each of the conductor blades 29 relative to the contact means 14. This actuator 16 acts through the opening 40, and acts on either the conductor blades 29 or the contact means 14. In the embodiment shown, this switch actuator 16 acts on the conductor blades 29. This switch actuator 16 is an insulator card which has apertures 70 disposed in a row. In the switch mechanism 11 illustrated in the drawings, there are 15 conductor blades 29, and these may be any reasonable plural number establishing multiple poles of the switch mechanism. In the row of apertures on the card 16 there is a preselected spacing of such apertures in order to establish beforehand the selected switch-open or switch-closed condition of a particular conductor blade relative to the contact means 14. In the embodiment shown, an aperture present in the row of apertures establishes a contact-closed condition, as shown in FIG. 4, and the absence of an aperture determines that the material of the insulator card spaces a given conductor blade from the contact means for a switch-open condition, as shown in FIG. 5. FIG. 1 shows the card 16 as having a V-shape leading edge 66 to aid insertion of the card through the flared opening 40, the V-shape establishing that not all of the contact blades 29 have to be wedged away from the bus bar 14 simultaneously. The card 16 also has a tab 67 entering a slot 68 in the cover 13 to aid in the removal of the card 16, when desired. The card 16 fits between the first and second faces 26 and 27 and acts on the conductor blades 29. In this embodiment, the card 16 acts between the conductor blades 29 and the bus bar 14 and, when in position, abuts a shoulder 69 to locate the card so that the row of preselected apertures 70 is along the first line of the contact means 14. A projection 71 is provided on each conductor blade 29 to aid in projecting through the card apertures 70 to engage the contact means 14.

Operation

The switch mechanism 11 is one which has a minimum number of parts for its multiple pole construction, and is one which is simply constructed and easily assembled, with a minimum of assembly time, alignment, and complications.

FIG. 1 illustrates the parts separated before complete assembly, with the conductor comb 15 vertically above the first face 26 of the first base member 17. In assembly, the bus bar ends 23 are inserted through the apertures 22 in base member 17. Next, the short legs 32 of the conductor blades are disposed individually in the conductor apertures 34. At this time of the assembly, the metallic conductor comb 15 does have the comb back 31 integrally attached to the individual conductor blades 29 to keep them in substantially parallel alignment. Next, the cover 13 is slid over the base member 17 as guided by the groove 48, the cover being received over the tongues or ledges 47 on the two opposite ends of the base member 17. This sliding movement of the cover is continued until the unitary latches 50 snap into the latch apertures 51 on the base member 17. At this point, the tongue 52 on the rear of the base member will be received in the groove 53 on the cover 13. Also, the abutment surface 56 on the cover will engage each of the conductor blade short legs 32 to force them against the forward side of the conductor apertures 34. Further, the individual abutments 57 on the underside of the cover 13 will enter the individual grooves 35 to force the long legs 33 of the conductor blades 29 downwardly against the base member 17. This clamping action in two mutually perpendicular directions establishes the individual conductor blades 29 in the grooves 35 and 41 to hold them in substantially parallel alignment. At this point, the conductor comb back 31 may be removed at the weakened area 44, and then the switch mechanism will be ready for operation by means of the switch actuator 16. However, in many applications it may be desired to retain this comb back 31 on the conductor comb 15 until completion of the next succeeding step.

The next step in assembly is to establish a compound base of the first base member 17 and second base member 18. This second base member may be a printed circuit board, for example, and the base member 17 is moved in a direction perpendicular to the first direction of sliding cover movement so that the bus bar ends 23 enter the bus bar apertures 63, the individual conductor blades 29 enter the conductor apertures 62, and the cover abutments 59 enter the abutment apertures 60. The abutments 59 and interengaging abutment apertures 60 properly position the base member 17 on the base member 18. The conductor blades 29 and bus bar ends 23 are then adhered to the base member 18 and, in this preferred embodiment, they are adhered by soldering at 72 to different parts of the conductor pattern 19. At this point, the comb back 31 may be removed as shown in FIG. 5, as by bending, to break it off at the score line 44. In so doing, the conductor blades 29 are then electrically isolated from each other, yet maintained in substantially parallel alignment by the grooves 35 and 41, as well as by the solder 72.

The individual conductor blades 33, as formed, have an inherent bias urging them toward the bus bar 14. This is further aided by the cover abutments 57. When the insulator card 16 is moved into position between the conductor blades and the bus bar 14, and there is an absence of an aperture in the row of apertures for a particular conductor blade, that particular conductor blade 29 is in an open circuit condition relative to the bus bar 14, as shown in FIG. 5. This is established by some form of insulation insulating the individual conductor blade 29 from the bus bar 14. This insulation may be provided by an insulating coating on the first and second faces 26 and 27, and in the preferred embodiment, the cover 13 and first base member 17 are both made from insulation material.

By this means, multiple poles of the switch mechanism 11 are created without the necessity of assembling tiny individual contacts. All the conductor blades 29 are assembled into the switch mechanism 17 at one time by the unitary or integral connection of the comb back 31. This aids materially in the quick and easy assembly and alignment of the individual conductor blades 29 in the switch mechanism 11, regardless of the plural number of such conductor blades 29.

The switch actuator card 16 may then be inserted into the flared opening 40 until the leading edge 66 engages the shoulder 69. This properly positions the card 16 so that if an aperture 70 in the card is present for a given conductor blade 29, as shown in FIG. 4, the conductor blade projection 71 will engage the bus bar 14 for a normally closed switch condition. If, as shown in FIG. 5, there is an absence of an aperture 70 in the row of apertures, then the conductor blade 29 is held spaced from the bus bar 14 by the material of the insulator card 16, and thus a switch-open condition is established.

The switch mechanism 11 may be used to set a desired code of $2^n$ of code combinations, where n is the number of poles of the switch. In this embodiment shown, there are 15 such poles for 32,768 possible combinations. If the tab slot 68 is provided in only one end of the cover 13, then the card 16 may be inserted in only one attitude relative to the base 17. However, if a slot is provided in each end of the cover 13, then the card 16 may be turned over end-for-end for a different code combination with the same insulator card 16.

The switch mechanism 11 is made from simple and easily fabricated parts. The contact means is a bus bar of wire, e.g., silver-plated wire. The conductor comb 15 is merely stamped from some conductive material, e.g., phosphor bronze which may be silver-plated on the contact side. The right-angle bend in the conductor blades 29 and the score line 44 may also be provided in this conductor comb, as by a progressive die, for easy and automatic fabrication of the conductor comb 15.

The base member 17 may be molded from insulation material, and it may be molded in a mold which is only a two-part mold having a parting plane parallel to the first face 26. The cover 13 may also be molded of insulating material in a mold which is also only a two-part mold. The parting line of such two-part mold would be in a plane parallel to the abutment surface 56. The insulator card 16 may be made from any suitable insulation material, such as polyester, polycarbonate, acrylic or fluoro-plastic, and may be of quite thin material, e.g., 0.003 in. to 0.020 in. thick. Such insulator cards may be formed in strips and punched in various preselected aperture combinations to give different code combinations, with the individual insulator cards joined together at the ends of the tabs 67. This small interconnection aids the ready separation of one tab from the next card in a long roll of interconnected insulator cards.

When the first base member 17 is mounted on the second base member 18, and the various conductors soldered to the underside of the base member 18, the first base member is sandwiched between the cover 13 and the base member 18. This secures the various parts of the switch mechanism 11 together and secures the cover on the base member 18, as well as securing the conductor blades or contact teeth 29 to the base member 18.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A multiple pole switch assembly comprising in combination,
   a housing having first and second opposed faces,
   contact means on said housing extending substantially in a row,
   a plurality of apertures extending through a part of said housing,
   a metallic conductor comb disposed between said faces and having a plurality of teeth extending in said apertures,
   an integral back on said comb extending on one side of said contact means with the plurality of teeth of the comb overlying said contact means and adapted to make selective engagement therewith,
   said comb back being accessible from an area exterior of said housing to be removable to establish individual contact blades of a multiple pole switch assembly,
   said housing including base means and a cover therefor,
   projections on said cover adapted to engage apertures in said base means,
   apertures in said base means adapted to receive said comb teeth, and
   means to secure said comb teeth to said base means to prevent removal of said cover and comb teeth from said base means.

2. A switch assembly as set forth in claim 1, including a plurality of grooves in one of said faces, and
   the individual teeth of said conductor comb lying individually in said grooves.

3. A switch assembly as set forth in claim 1, including a plurality of grooves partly defined in each of said first and second faces, and
   individual teeth of said conductor comb lying singly in said grooves to maintain substantially parallel alignment of said conductor teeth after said comb back is removed.

4. A switch assembly as set forth in claim 1, including an indented score line on said comb teeth to form weakened areas aiding removal of said comb back.

5. A switch assembly as set forth in claim 1, including means to mutually insulate said individual contact blades after removal of said comb back.

6. A switch assembly as set forth in claim 1, including an opening in said housing, and
   switch actuator means acting through said opening to selectively actuate said contact blades between open and closed switch conditions relative to said contact means.

7. A multiple pole switch assembly comprising, in combination,
   a housing having first and second opposed faces and an opening,
   contact means extending along a first line on said first face,
   a metallic conductor comb adjacent one of said faces and having a plurality of contact teeth extending substantially parallel,
   an integral back on said comb extending on one side of said first line with the plurality of teeth of the comb overlying said contact means,
   an area on each of said comb contact teeth adapted to engage said contact means to establish a switch-closed condition,
   said comb back being accessible from an area exterior of said housing to be removable to establish electrically separate contact teeth of a multiple pole switch assembly,
   switch actuator means including an insulator card acting through said housing opening into the space between said faces to coact with said contact teeth,
   said insulator card having a preselected spacing of apertures in a row with the presence or absence of an aperture in said row at a given contact tooth determining switch-open or switch-closed conditions,
   said housing including base means and a cover therefor,
   said first face being on said base means,
   said second face being on said cover,
   a substantially right-angle bend in each of said teeth to form long and short legs of L-shaped teeth,
   a shoulder abutment on said cover engaging the short leg of the L-shaped teeth to secure each tooth in a direction parallel to said first face, and
   individual abutments on said cover engaging the long leg of each tooth to secure each tooth in a direction perpendicular to said first face.

8. A switch assembly as set forth in claim 7, including the presence of an aperture in said row in said insulator card establishing a switch-closed condition between a given contact tooth and its associated contact means and the absence of an aperture in said row establishing the presence of insulator card material between a second given tooth and its associated contact means for a switch-open condition.

9. A switch assembly as set forth in claim 7, wherein said contact means includes a single bus bar engageable by each of said comb teeth.

10. A switch assembly as set forth in claim 7, including alignment grooves in one of said faces to receive individual ones of said comb teeth.

11. A switch assembly as set forth in claim 10, wherein said alignment grooves are established partly in each of said first and second faces.

12. A switch assembly as set forth in claim 7, wherein said opening is a flared opening, and
   said insulator card is slidable through said opening.

13. A switch assembly as set forth in claim 12, wherein said card is slidable through said opening substantially parallel to said first face.

14. A switch assembly as set forth in claim 7, including,
   apertures in said base means to receive said comb teeth, and
   means to secure said comb teeth to said base means.

15. A switch assembly as set forth in claim 14, including abutment apertures in said base means, and
   abutments on said cover received in said base means abutment apertures in a direction parallel to the contact teeth engaging said base means 16. A switch assembly comprising, in combination,
   a housing including base means and a cover therefor,
   said base means having a first face,
   a plurality of conductor blades on said base means extending substantially parallel to each other,
   contact means on said first face of said base means in a first line cooperable with each of said conductor blades, said cover being closable on said base means in a first direction substantially parallel to said conductor blades, alignment surfaces on one of said cover and said base means substantially parallel to said first direction maintaining substantially parallel alignment of said conductor blades, switch actuator means acting on one of said conductor blades and said contact means to establish selective conductive and non-conductive conditions for each of said conductor blades relative to said contact means, said base means including apertures, said conductor blades extending through said apertures in said base means in a second direction, and said cover being slidably received on said base means in a direction perpendicular to the second direction.

17. A switch assembly as set forth in claim 16, including a second face on said cover opposite to said first face, a plurality of grooves in one of said faces, and said conductor blades lying one each in respective ones of said grooves.

18. A switch assembly as set forth in claim 17, wherein said plurality of grooves is established partly in said first face and partly in said second face.

19. A switch assembly as set forth in claim 16, wherein said switch actuator means includes a thin insulator card having a predetermined number and spacing of apertures along a row, and said insulator card being insertable between said cover and said base means with said apertures establishing one of switch-open and switch-closed conditions of a selected conductor blade and the cooperable contact means.

20. A switch assembly as set forth in claim 19, wherein the presence of an aperture in said row establishes a switch-closed condition of the selected conductor blade and the cooperable contact means.

21. A switch assembly as set forth in claim 16, including cooperable tongue and groove means on two opposite sides of said base means and said cover to establish sliding engagement therebetween in said first direction.

22. A switch assembly as set forth in claim 21, including cooperable tongue and groove means on a third intermediate side of said base means and said cover to establish an abutment limiting relative sliding movement of said base means and said cover.

23. A switch assembly as set forth in claim 22, including abutments on said cover engageable with said conductor blades to effectively clamp a portion of each of said conductor blades against said base means.

24. A multiple pole switch assembly comprising in combination, a housing having first and second opposed faces, contact means on said housing extending substantially in a row, a plurality of apertures extending through a part of said housing, a metallic conductor comb disposed between said faces and having a plurality of teeth extending in said apertures, an integral back on said comb extending on one side of said contact means with the plurality of teeth of the comb overlying said contact means and adapted to make selective engagement therewith, said comb back being accessible from an area exterior of said housing to be removable to establish individual contact blades of a multiple pole switch assembly, a first and a second base sandwiched together as part of said housing, said plurality of apertures extending through both of said bases, said conductor teeth extending through the apertures in said first base and into the apertures in said second base, and means for adhering said conductor teeth to said second base to securely hold said conductor teeth in substantially parallel alignment whereby said comb back may be removed after adhering of the teeth.

25. A switch assembly as set forth in claim 24, wherein said adhering of said teeth secures together said first and second bases.

26. A switch assembly as set forth in claim 24, wherein said adhering of said teeth includes soldering of said teeth to a circuit pattern on said second base.

27. A switch assembly comprising, in combination, a housing including base means and a cover therefor, said base means having a first face, a plurality of conductor blades on said base means extending substantially parallel to each other, contact means on first face of said base means in a first line cooperable with each of said conductor blades, said cover being closable on said base means in a first direction substantially parallel to said conductor blades, alignment surfaces on one of said cover and said base means substantially parallel to said first direction maintaining substantially parallel alignment of said conductor blades, switch actuator means acting on one of said conductor blades and said contact means to establish selective conductive and non-conductive conditions for each of said conductor blades relative to said contact means, said base means including first and second bases, conductor apertures in said first and second bases, said conductor blades being receivable in said conductor apertures, and means to secure said conductor blades to said second base through said first base.

28. A switch assembly as set forth in claim 27, wherein said securing means includes solder securing said conductor blades to conductive material on said second base.

29. A switch assembly as set forth in claim 27, including interengageable surfaces on said base means and said cover establishing sliding engagement therebetween in said first direction, and interengageable abutments on said second base and said cover engageable by relative motion perpendicular to said first direction.

* * * * *